(12) United States Patent
Yang

(10) Patent No.: US 8,740,601 B2
(45) Date of Patent: *Jun. 3, 2014

(54) 3-PLATE MOLD ASSEMBLY WITH A COMMON MOLD BASE

(76) Inventor: Teng-Jen Yang, Taichung County (TW)

( * ) Notice: Subject to any disclaimer, the term of this patent is extended or adjusted under 35 U.S.C. 154(b) by 338 days.

This patent is subject to a terminal disclaimer.

(21) Appl. No.: 13/204,716

(22) Filed: Aug. 8, 2011

(65) Prior Publication Data

US 2013/0040014 A1    Feb. 14, 2013

(51) Int. Cl.
*B29C 45/26* (2006.01)

(52) U.S. Cl.
USPC ............ 425/192 R; 425/185; 425/190

(58) Field of Classification Search
USPC ............ 425/185, 190, 192 R, 542, 556
See application file for complete search history.

(56) References Cited

U.S. PATENT DOCUMENTS

| | | | | |
|---|---|---|---|---|
| 3,564,660 | A * | 2/1971 | Darnell | 425/192 R |
| 4,202,522 | A * | 5/1980 | Hanas et al. | 249/102 |
| 4,828,479 | A * | 5/1989 | Pleasant | 425/192 R |
| 5,350,289 | A * | 9/1994 | Martin | 425/190 |
| 5,562,935 | A * | 10/1996 | Martin | 425/552 |
| 6,213,750 | B1 * | 4/2001 | Dean et al. | 425/183 |
| 6,981,858 | B2 * | 1/2006 | Wieder | 425/107 |
| 8,297,963 | B2 * | 10/2012 | Yang | 425/185 |

* cited by examiner

*Primary Examiner* — Yogendra Gupta
*Assistant Examiner* — Emmanuel S Luk
(74) *Attorney, Agent, or Firm* — Banger Shia

(57) ABSTRACT

A 3-plate mold assembly with a common mold base comprises: a stationary mold mounted on a fixed side of an injection molding machine and a movable mold mounted on a movable side of the injection molding machine. The stationary mold comprises a stationary-side fixed plate on which are disposed four pillars to be inserted through a stripper and into a female insert assembly. When new products need to be produced, it only needs to replace the female and male insert and the rest parts of the stationary and movable molds don't need to be replaced, thus substantially saving production cost.

7 Claims, 4 Drawing Sheets

3-PLATE MOLD ASSEMBLY WITH A COMMON MOLD BASE

BACKGROUND OF THE INVENTION

1. Field of the Invention

The present invention relates to a plastic injection mold, and more particularly to a 3-plate mold assembly with a common mold base.

2. Description of the Prior Art

Plastic injection molding is used for quick and mass production and has been widely applied in different fields.

A mold is only capable of producing one type of products, so it has to design a whole new mold when a new product needs to be produced. A mold essentially comprises a base and an insert disposed on the base, and then the base is mounted on a plastic injection molding machine. The base and the insert are exclusively designed to pair with each other, therefore, they must be replaced together when a new mold is needed to produce new products, which inevitably creases the production cost. On the other hand, if the products to be produced are large, the corresponding mold must also be relatively large, therefore, the replacing of such a large mold must be inconvenient and probably requires the use of a crane sometimes.

The present invention has arisen to mitigate and/or obviate the afore-described disadvantages.

SUMMARY OF THE INVENTION

The primary object of the present invention is to provide a 3-plate mold assembly with a common mold base, when new products need to be produced, it only needs to replace the female and male insert and the rest parts of the stationary and movable molds don't need to be replaced, thus substantially saving production cost.

To achieve the above object, a 3-plate mold assembly with a common mold base in accordance with the present invention comprises: a stationary mold mounted on a fixed side of an injection molding machine and a movable mold mounted on a movable side of the injection molding machine. The stationary mold comprises a stationary-side fixed plate on which being disposed four pillars to be inserted through a stripper and into a female insert assembly.

The movable-side fixed plate is mounted on a movable side of the injection molding machine and comprises a movable-side fixed plate, two space plates, a plurality of clamping blocks and a male insert.

The movable-side fixed plate is mounted on a movable side of the injection molding machine.

The space plates are oppositely disposed on the movable-side fixed plate and each are formed with two holes for insertion of the pillars of the stationary-side fixed plate.

The clamping blocks are L-shaped and each include an assembling portion and a pressing portion, a screw is inserted through the assembling portion and screwed into the space plates, thus fixing the clamping blocks to the space plates.

The male insert is combined with the female insert assembly, in each of two opposite lateral surfaces of the male insert is formed a slide groove, the male insert is positioned between the clamping blocks fixed to the space plates, and the pressing portions of the clamping blocks are engaged in slide groove.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
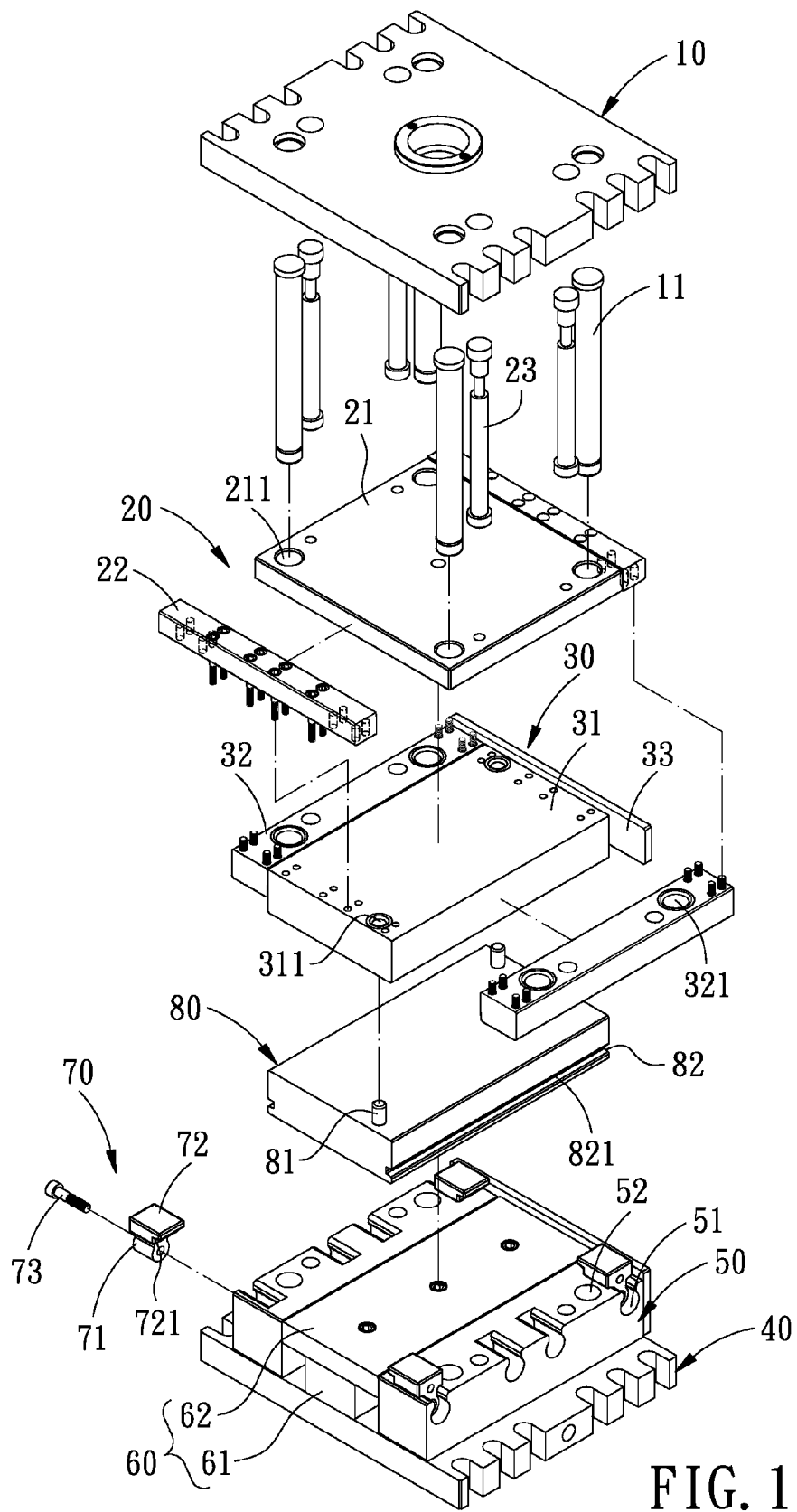
FIG. 1 is an exploded view of a 3-plate mold assembly with a common mold base in accordance with the present invention.
Figure 2:
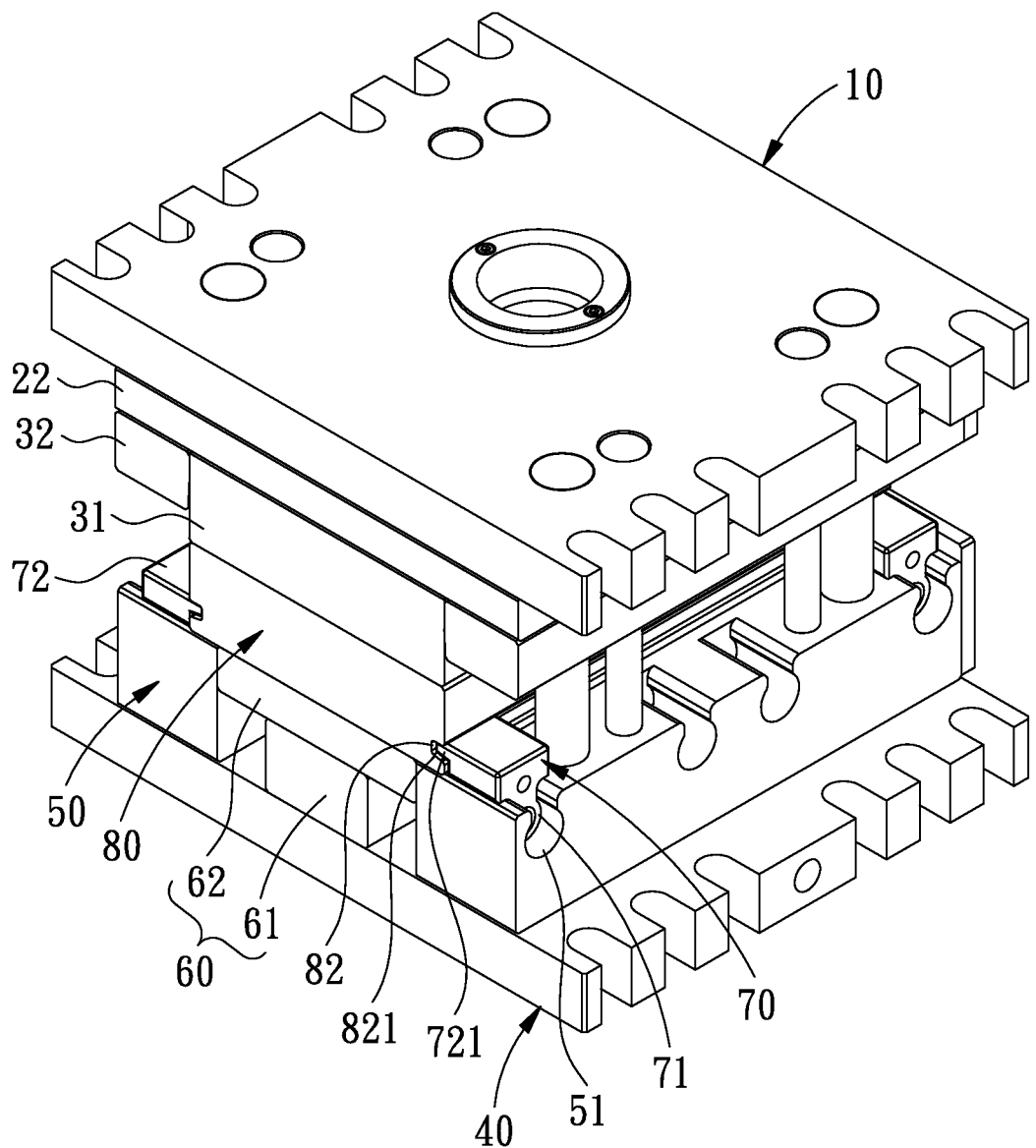
FIG. 2 is an assembly view of the 3-plate mold assembly with a common mold base in accordance with the present invention.
Figure 3:
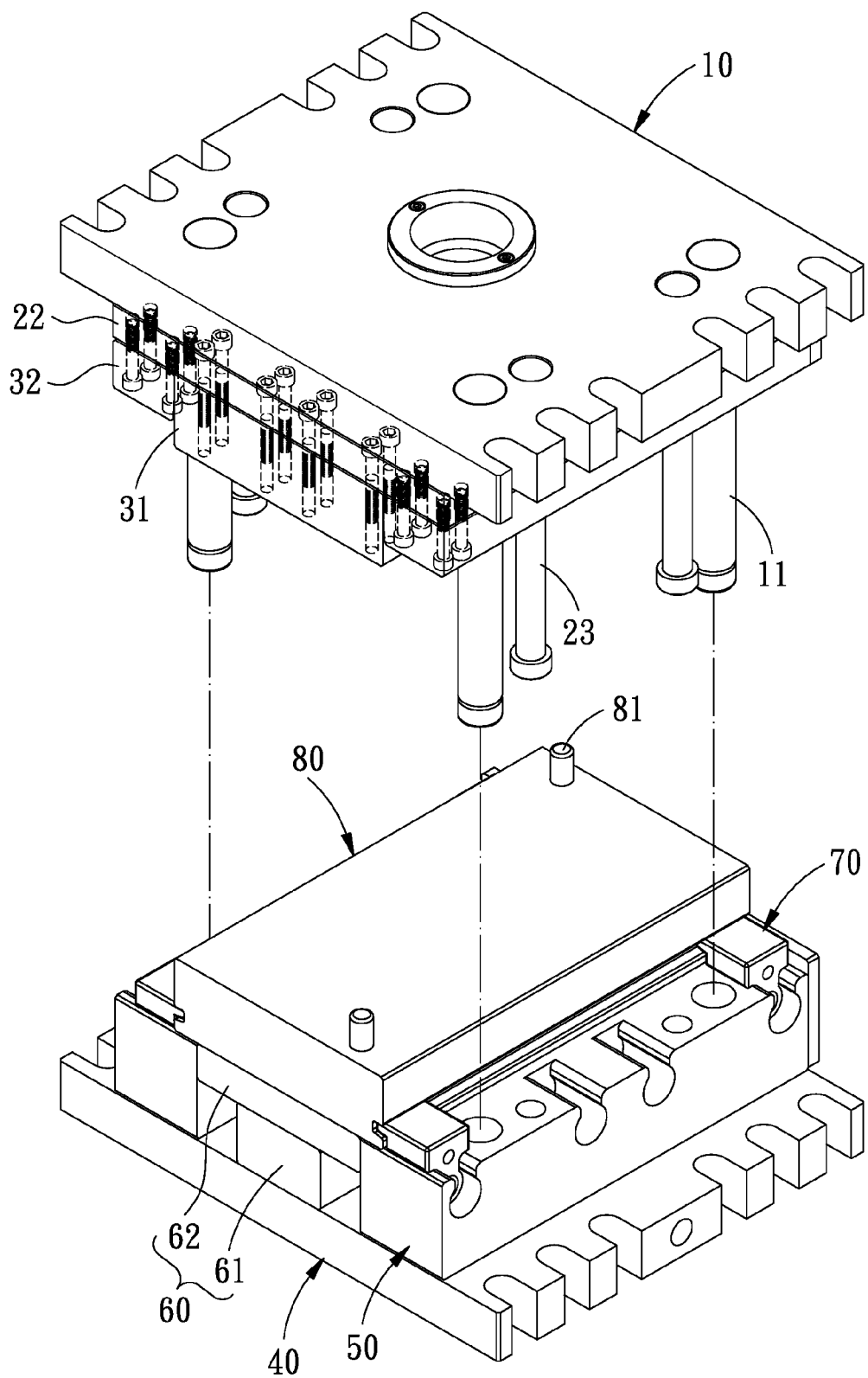
FIG. 3 is an illustrative view of the 3-plate mold assembly with a common mold base in accordance with the present invention, showing that the movable mold is separated from the fixed mold.
Figure 4:
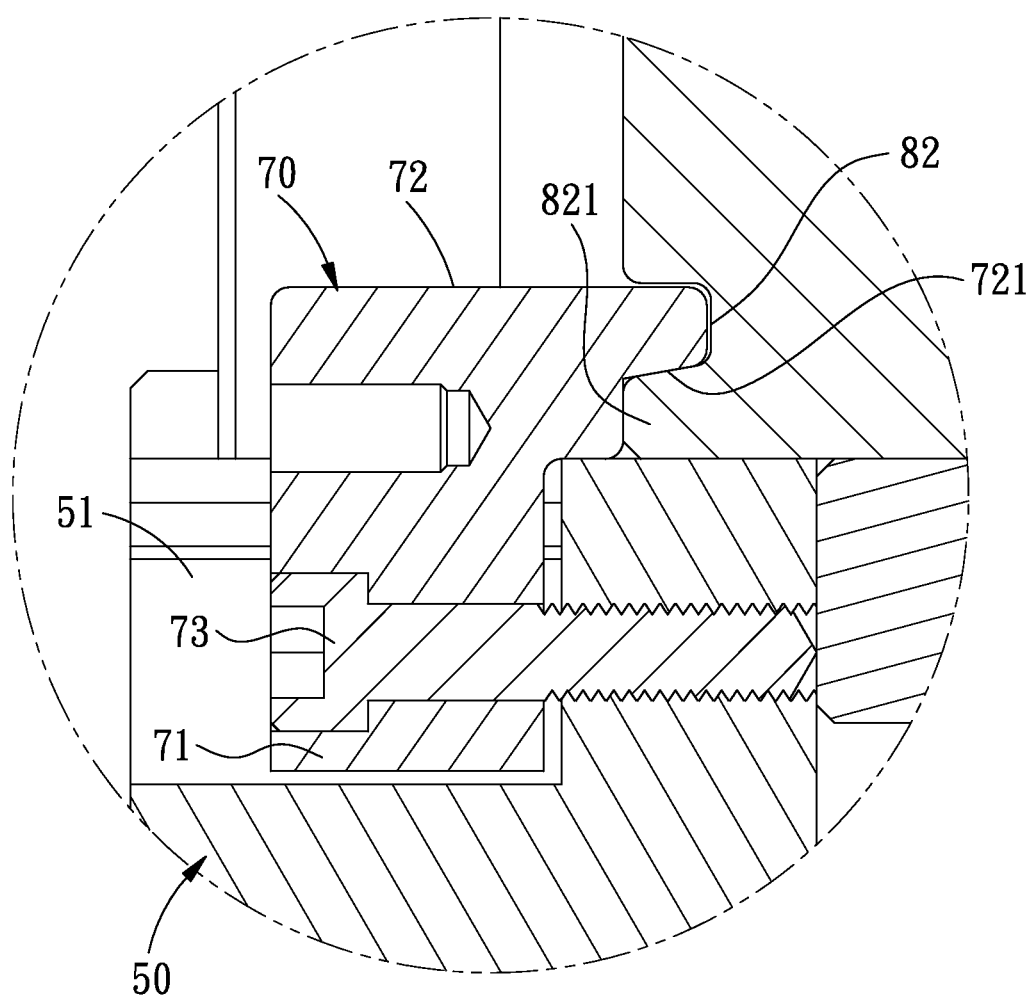
FIG. 4 is an amplified view of a part of the movable mold of the 3-plate mold assembly with a common mold base in accordance with the present invention.

Referring to FIGS. 1-4, a 3-plate mold assembly with a common mold base in accordance with the present invention comprises a stationary mold and a movable mold. The stationary mold is mounted on a fixed side of an injection molding machine and comprises a stationary-side fixed plate 10, a stripper 20 and a female insert assembly 30.

On the stationary-side fixed plate 10 are disposed four pillars 11.

The stripper 20 comprises a stripping plate 21, two racks 22, and four pulling rods 23. The stripping plate 21 is formed with four pillar-holes 211 for insertion of the pillars 11 of the stationary-side fixed plate 10.

The two racks 22 are disposed at two opposite sides of the stripping plate 21.

The pulling rods 23 are inserted through the stripping plate 21 and each have one end fixed to the stationary-side fixed plate 10.

The female insert assembly 30 comprises a female insert 31, two racks 32 and a blocking plate 33. The female insert 31 is formed with two holes 311, and the two racks 32 are disposed at two opposite sides of the female insert 31 and located vertical to the racks 22 of the strippers 20. Each of the racks 32 is formed with two guiding holes 321 for insertion of the pillars 11. The blocking plate 33 is abutted against one side of the female insert 31 and the racks 32, and both ends of the racks 32 are fixed to the racks 22. The pulling rods 23 each have another end fixed to the racks 32.

The movable mold comprises: a movable-side fixed plate 40, two space plates 50, a supporting device 60, a plurality of clamping blocks 70 and a male insert 80.

The movable-side fixed plate 40 is mounted on a movable side of the injection molding machine.

The space plates 50 are oppositely disposed on the movable-side fixed plate 40 and each are formed with a plurality of assembling grooves 51 and two holes 52 for insertion of the pillars 11 of the stationary-side fixed plate 10.

The supporting device 60 comprises a first supporting block 61 and a second supporting block 62 which are arranged between the space plates 50 in a superposed manner, and the top surface of the second supporting block 62 is level with the surfaces of the two space plates 50.

The clamping blocks 70 are approximately L-shaped and each include an assembling portion 71 and a pressing portion 72 with an oblique pressing surface 721. The assembling portion 71 is formed to fit in the assembling grooves 51 of the space plates 50, and a screw 73 is inserted through the assembling portion 71 and screwed into the space plates 50, thus fixing the clamping blocks 70 to the space plates 50.

The male insert 80 is to be combined with the female insert 31 and provided with two pins 81 to be inserted in the holes 311 of the female insert 31, and in each of two opposite lateral surfaces of the male insert 80 is formed a slide groove 82 which includes an oblique surface 821. The male insert 80 is positioned in such a manner that each of the slide grooves 82 is located between the clamping blocks 70 of the two space plates 50, while the oblique pressing surface 721 is pressed against the oblique surface 821 of the male insert 80.

The structural relations of the respective parts of the 3-plate mold assembly abovementioned are as mentioned above, and the stripper 20 is used to remove extra materials.

The male insert 80 is fixed by the clamping blocks 70, therefore, the replacing of the male insert 80 can be easily done by unscrewing the screws 73, and then pulling the clamping blocks 70 out of the assembling grooves 51, so that the oblique pressing surface 721 of the clamping block 70 is disengaged from the oblique surface 821 of the male insert 80, which allows the male insert 80 to be pushed out by the user.

Furthermore, since the oblique surfaces 821 of the male insert 80 are pressed against by the oblique pressing surface 721 of the clamping blocks 70, when the screws 73 fix the clamping blocks 70 to the male insert 80, the forces of the screws 73 will be evenly applied to the oblique surfaces 821 of the male insert 80 through the oblique pressing surface 721 of the clamping blocks 70. Furthermore, the force applied to the oblique surface is an oblique force which consists of a vertical component force and a horizontal component force, which provides a much better clamping effect.

Finally, since the female insert assembly 30 is supported by the racks 32 and the blocking plate 33 and assembled to the racks 22 of the stripper 20, it only needs to replace the female insert assembly 30 when new products are to be produced, and the racks 32 and the blocking plate 33 should not be replaced and can still work with the stripper 20. That is to say that, when new products need to be produced, it only needs to replace the female and male insert 31, 80 and the rest parts (namely, the mold base) of the stationary and movable molds don't need to be replaced, thus substantially saving production cost.

While we have shown and described various embodiments in accordance with the present invention, it is clear to those skilled in the art that further embodiments may be made without departing from the scope of the present invention.

What is claimed is:

1. A 3-plate mold assembly with a common mold base comprising:

a stationary mold mounted on a fixed side of an injection molding machine and comprising a stationary-side fixed plate on which being disposed four pillars to be inserted through a stripper and into a female insert assembly;

a movable-side fixed plate mounted on a movable side of the injection molding machine and comprising a movable-side fixed plate, two space plates, a plurality of clamping blocks and a male insert;

the movable-side fixed plate being mounted on a movable side of the injection molding machine;

the space plates being oppositely disposed on the movable-side fixed plate and each being formed with two holes for insertion of the pillars of the stationary-side fixed plate;

the clamping blocks being L-shaped and each including an assembling portion and a pressing portion, a screw being inserted through the assembling portion and screwed into the space plates, thus fixing the clamping blocks to the space plates; and the male insert being combined with the female insert assembly, in each of two opposite lateral surfaces of the male insert being formed a slide groove, the male insert being positioned between the clamping blocks fixed to the space plates, and the pressing portions of the clamping blocks being engaged in slide groove.

2. The 3-plate mold assembly with a common mold base as claimed in claim 1, wherein the pressing portion of each of the clamping blocks is provided with an oblique pressing surface, and in the slide groove of the male insert is provided with an oblique surface, the oblique pressing surface of each of the clamping blocks is pressed against the oblique surface of the male insert.

3. The 3-plate mold assembly with a common mold base as claimed in claim 1, wherein each of the space plates is formed with a plurality of assembling grooves, and the assembling portion of the respective clamping blocks is formed to fit in the assembling grooves of the space plates.

4. The 3-plate mold assembly with a common mold base as claimed in claim 1, wherein the stripper comprises a stripping plate, two racks, and four pulling rods, the stripping plate is formed with four pillar-holes for insertion of the pillars of the stationary-side fixed plate, the two racks are disposed at two opposite sides of the stripping plate, and the pulling rods are inserted through the striping plate and each have one end fixed to the stationary-side plate.

5. The 3-plate mold assembly with a common mold base as claimed in claim 4, wherein the female insert assembly comprises a female insert, two racks and a blocking plate, the two racks of the female insert assembly are disposed at two opposite sides of the female insert and located vertical to the racks of the strippers, each of the racks of the female insert assembly is formed with two guiding holes for insertion of the pillars, the blocking plate is abutted against one side of the female insert and the racks, and both ends of the racks of the female insert assembly are fixed to the racks of the stripper, and then the pulling rods each have another end fixed to the racks of the female insert assembly.

6. The 3-plate mold assembly with a common mold base as claimed in claim 5, wherein the male insert is provided with two pins to be inserted in two holes formed in the female insert.

7. The 3-plate mold assembly with a common mold base as claimed in claim 1 further comprising a supporting device which comprises a first supporting block and a second supporting block which are arranged between the space plates in a superposed manner, and the top surface of the second supporting block is level with top surfaces of the two space plates.

* * * * *